US012206186B2

(12) United States Patent
Jang

(10) Patent No.: US 12,206,186 B2
(45) Date of Patent: Jan. 21, 2025

(54) ANTENNA MODULE

(71) Applicant: AMOSENSE CO., LTD, Cheonan-si (KR)

(72) Inventor: Kil Jae Jang, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 105 days.

(21) Appl. No.: 18/002,631

(22) PCT Filed: Jun. 16, 2021

(86) PCT No.: PCT/KR2021/007527
§ 371 (c)(1),
(2) Date: Dec. 20, 2022

(87) PCT Pub. No.: WO2021/261833
PCT Pub. Date: Dec. 30, 2021

(65) Prior Publication Data

US 2023/0238702 A1 Jul. 27, 2023

(30) Foreign Application Priority Data

Jun. 22, 2020 (KR) ........................ 10-2020-0075996

(51) Int. Cl.
*H01Q 7/00* (2006.01)
*H01Q 1/24* (2006.01)
(Continued)

(52) U.S. Cl.
CPC ............... *H01Q 7/00* (2013.01); *H01Q 1/243* (2013.01); *H01Q 1/38* (2013.01); *H01Q 1/526* (2013.01)

(58) Field of Classification Search
CPC ............ H01Q 7/00; H01Q 1/243; H01Q 1/38; H01Q 1/526
See application file for complete search history.

(56) References Cited

FOREIGN PATENT DOCUMENTS

KR 10-2016-0121279 A 10/2016
KR 20160121279 A * 10/2016
(Continued)

OTHER PUBLICATIONS

International Search Report for PCT/KR2021/007527 by Korean Intellectual Property Office dated Oct. 14, 2021.

*Primary Examiner* — Henry Luong
(74) *Attorney, Agent, or Firm* — BROADVIEW IP LAW, PC

(57) ABSTRACT

An antenna module is provided. An antenna module according to an exemplary embodiment of the present invention comprises: an antenna unit including an antenna pattern, which has a pattern portion and a lead portion formed, respectively, on both surfaces of a circuit board; a magnetic field shielding sheet including a sheet body made of a magnetic material to block a magnetic field, and a plurality of eddy current reducing pattern portions formed on the sheet body to reduce the generation of eddy current by increasing the resistance of the sheet body; and an insulation member arranged between the antenna unit and the magnetic field shielding sheet, wherein the antenna unit is provided in an asymmetric form in which the pattern portion and the lead portion respectively formed on both surfaces of the circuit board have different thicknesses.

11 Claims, 10 Drawing Sheets

(51) Int. Cl.
*H01Q 1/38* (2006.01)
*H01Q 1/52* (2006.01)

(56) References Cited

FOREIGN PATENT DOCUMENTS

| | | | | |
|---|---|---|---|---|
| KR | 10-2017-0076566 | A | 7/2017 | |
| KR | 10-2017-0096877 | A | 8/2017 | |
| KR | 10-2018-0088352 | A | 8/2018 | |
| KR | 10-2020-0032620 | A | 3/2020 | |
| KR | 10-2020-0032991 | A | 3/2020 | |
| WO | WO-2014137151 | A1 * | 9/2014 | ....... G06K 19/07783 |
| WO | WO-2019123985 | A1 * | 6/2019 | |

* cited by examiner

ANTENNA MODULE

CROSS-REFERENCE TO RELATED APPLICATIONS

This application is a National Phase Entry Application of PCT Application No. PCT/KR2021/007527 filed on Jun. 16, 2021, which claims priority to Korean Patent Application No. 10-2020-0075996 filed on Jun. 22, 2020, in Korean Intellectual Property Office, the entire contents of which are hereby incorporated by reference in its entirety.

TECHNICAL FIELD

The present invention relates to an antenna module.

BACKGROUND ART

Near field communication (NFC) and wireless charging are non-contact transmission methods.

These non-contact transmission methods are implemented through an antenna module including an antenna unit configured to transmit or receive a magnetic field, and a magnetic field shielding sheet disposed on one surface of the antenna unit to smoothly transmit or receive the magnetic field.

Meanwhile, as the magnetic field shielding sheet, a sheet in the form separated into multiple pieces is used to reduce loss due to an eddy current.

However, in the magnetic field shielding sheet in the form of being separated into multiple pieces through a flake process, since multiple pieces constituting the sheet become smaller in size as the flake process for separating the sheet into multiple pieces is repeatedly performed, the shielding sheet formed of multiple pieces having a small size has a problem in that permeability drops to 1600 or less.

In order to solve this problem, attempts are being made to develop a magnetic field shielding sheet capable of realizing high permeability while increasing the resistance of the sheet itself by forming a through portion inside the magnetic field shielding sheet through a punching process.

However, in the magnetic field shielding sheet having a through portion, burrs or particles are incidentally produced in the process of forming the through portion during the punching process.

Accordingly, when an antenna module is configured by attaching the magnetic field shielding sheet in a state in which burrs or particles are not completely removed to a circuit board, the antenna module has a problem that a short circuit occurs on the circuit board side due to the burrs or particles.

For this reason, in order to secure electrical stability, an antenna module using a method of disposing an insulating film having a great thickness between a circuit board and a magnetic field shielding sheet has been proposed.

However, when an antenna module is configured by placing an insulating film having a great thickness between a circuit board and a magnetic field shielding sheet, a short circuit problem caused by burrs or particles may be solved, but the thickness of the insulating film used increases, thereby increasing the overall thickness of the antenna module.

Accordingly, an antenna module employing a thick insulating film has limitations in application to products requiring light, thin, compact, and small components, such as mobile phones.

Technical Problem

The present invention is directed to providing an antenna module capable of solving a short circuit problem caused by burrs or particles without increasing the thickness of an insulating member disposed between a circuit board and a magnetic field shielding sheet.

In addition, the present invention is directed to providing an antenna module capable of improving performance as an antenna by increasing the thickness of a pattern portion constituting an antenna pattern while maintaining the overall thickness.

Technical Solution

One aspect of the present invention provides an antenna module including: an antenna unit including an antenna pattern which has a pattern portion and a lead portion formed, respectively, on both surfaces of a circuit board; a magnetic field shielding sheet including a sheet body made of a magnetic material to shield a magnetic field, and a plurality of eddy current reducing pattern portions formed in the sheet body to reduce the generation of an eddy current by increasing the resistance of the sheet body; and an insulation member disposed between the antenna unit and the magnetic field shielding sheet, and the antenna unit is provided in an asymmetric form in which the pattern portion and the lead portion respectively formed on both surfaces of the circuit board have different thicknesses.

In addition, the pattern portion may be formed on a first surface of the circuit board, and at least a portion of the lead portion may be formed on a second surface of the circuit board opposite to the first surface. In this case, a thickness of the lead portion formed on the second surface of the circuit board may be thinner than that of the pattern portion.

In addition, the insulating member may be disposed between the antenna unit and the magnetic field shielding sheet to cover the second surface of the circuit board. In this case, the insulating member may be a film member having insulating properties.

In addition, the eddy current reducing pattern portion may be formed in a region corresponding to the antenna pattern among the entire area of the sheet body.

In addition, the antenna pattern may be a wireless power receiving antenna configured to receive wireless power.

In addition, the antenna pattern may include a wireless power receiving antenna configured to receive wireless power and a wireless communication antenna for wireless data communication. In this case, the eddy current reducing pattern portion may be formed only in a region corresponding to the wireless power receiving antenna.

In addition, the wireless communication antenna may include a first wireless communication antenna formed on the circuit board to surround the wireless power receiving antenna and a second wireless communication antenna formed on the circuit board to be located at a side of a hollow portion of the wireless power receiving antenna, and the first wireless communication antenna and the second wireless communication antenna may be connected in series.

In addition, the eddy current reducing pattern portion may be a linear through portion formed to pass through the sheet body to have a length greater than a width.

In addition, the eddy current reducing pattern portion may be a through portion formed to pass through the sheet body through punching, the sheet body may include a facing surface facing the insulating member and the circuit board and a non-facing surface opposite to the facing surface, and the through portion may be formed in a direction from the facing surface toward the non-facing surface of the sheet body.

In addition, the sheet body may include a plurality of cracks formed extending from the eddy current reducing pattern portion.

Advantageous Effects

According to the present invention, it is possible to maintain a small thickness while reducing costs by solving a short circuit problem caused by burrs or particles while maintaining the overall thickness of an antenna module at a very small thickness.

In addition, according to the present invention, a thickness of the pattern portion of the antenna pattern can be further increased while maintaining a small thickness, thereby improving performance as an antenna.

MODES OF THE INVENTION

Figure 1:
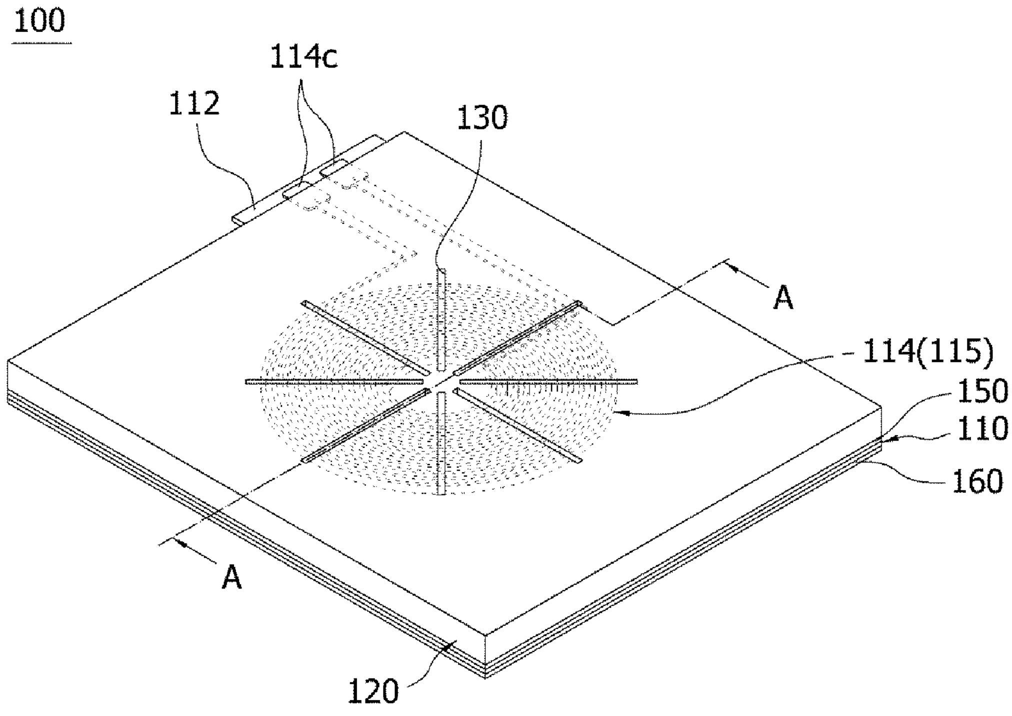
FIG. 1 is a view illustrating an antenna module according to one embodiment of the present invention.

Hereinafter, with reference to the accompanying drawings, the embodiments of the present invention will be described in detail so that those skilled in the art may easily implement the present invention. The present invention may be embodied in many different forms and is not limited to the embodiments set forth herein. In order to clearly describe the present invention in the drawings, parts irrelevant to the description are omitted, and the same reference numerals are added to the same or similar components throughout the specification.

Figure 5:
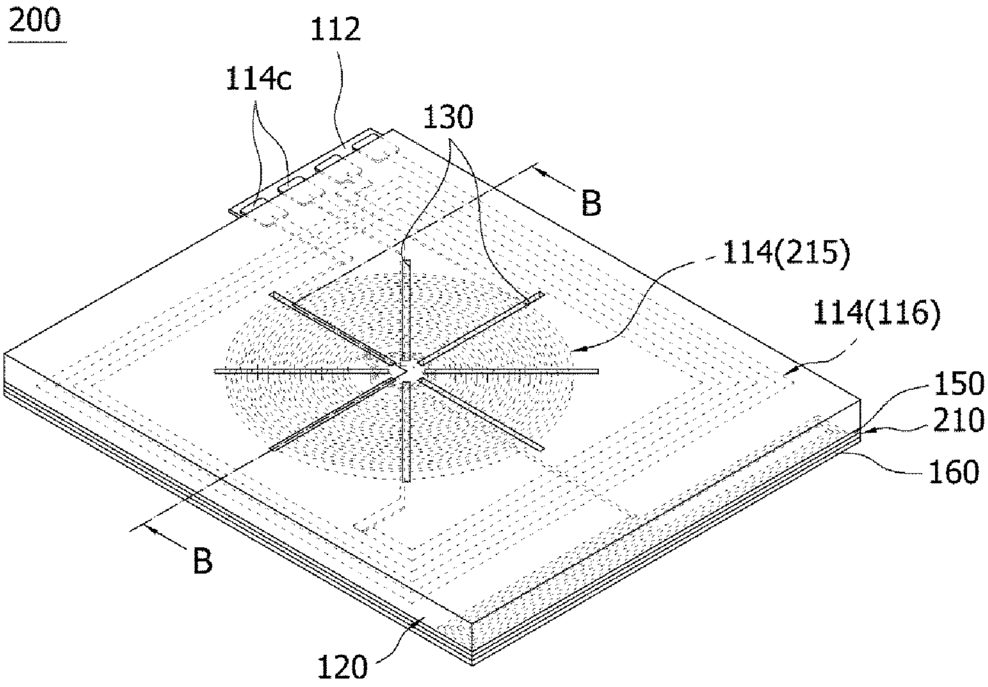
FIG. 5 is a view illustrating an antenna module according to another embodiment of the present invention.

An antenna module 100 according to one embodiment of the present invention includes an antenna unit 110 or 210, a magnetic field shielding sheet 120, and an insulating member 150 as shown in FIGS. 1 and 5.

The antenna unit 110 or 210 may perform a predetermined function using a magnetic field of a predetermined frequency band.

To this end, the antenna unit 110 or 210 may include a circuit board 112 and at least one antenna pattern 114 formed on at least one surface of the circuit board 112.

That is, the antenna pattern 114 may include a wireless power transfer antenna 115 or 215 configured to transmit or receive wireless power, a wireless communication antenna 116 for wireless communication, and an MST antenna for magnetic payment.

For example, as shown in FIGS. 1 to 4, the antenna pattern 114 may be configured only with the wireless power transfer antenna 115.

In this case, the wireless power transfer antenna 115 may also include a hollow portion E having a predetermined area in a central portion thereof.

Here, the wireless power transfer antenna 115 may be an antenna for wireless power transmission to transmit wireless power or an antenna for wireless power reception to receive wireless power.

Alternatively, the antenna pattern 114 may be a combo type including the wireless communication antenna 116 as well as the wireless power transfer antenna 215 as shown in FIGS. 5 to 9.

In this case, the wireless communication antenna 116 may be formed on the circuit board 112 to surround only an outer periphery of the wireless power transfer antenna 215, but the wireless communication antenna 116 may include a first wireless communication antenna **116*a* formed on the circuit board 112 to surround the outer periphery of the wireless power transfer antenna 215 so as to increase a recognition rate, and a second wireless communication antenna 116*b* formed on the circuit board 112 to be located on a side of the hollow portion of the wireless power transfer antenna 215, and the first wireless communication antenna 116*a* and the second wireless communication antenna 116*b*** may be connected to each other in series.

In addition, the wireless power transfer antenna 215 may include the hollow portion E having a predetermined area in a central portion, a first wireless power transfer antenna **215*a* formed on the circuit board 112 to surround the hollow portion with a predetermined number of turns, and a second wireless power transfer antenna 215*b* formed on the circuit board 112 to be located outside the wireless communication antenna 116**.

Here, the first wireless power transfer antenna **215*a* and the second wireless power transfer antenna 215*b* may be connected in series with each other. In addition, the wireless power transfer antenna 215 including the first wireless power transfer antenna 215*a* and the second wireless power transfer antenna 215*b* may perform a wireless power transfer function of receiving or transmitting wireless power. In addition, the wireless power transfer antenna 215** may also perform a magnetic payment function as well as a wireless power transfer function through switching of a circuit unit (not shown).

Meanwhile, in the antenna modules 100 and 200 according to one embodiment of the present invention, the antenna pattern 114 may include a pattern portion **114*a* and a lead portion 114*b*, and at least a portion of the lead portion 114*b* and the pattern portion 114*a* may be formed on both surfaces of the circuit board 112** to have a predetermined thickness, respectively.

Here, the pattern portion **114*a* may be a portion of the antenna pattern 114 for functioning as an antenna, and the lead portion 114*b* may be a portion of the antenna pattern 114 that connects the pattern portion 114*a* to a connection terminal 114*c* formed on one side of the circuit board 112**.

In addition, the lead portion **114*b* may be a portion that interconnects two pattern portions 114*a* on the circuit board 112**.

Further, both surfaces of the circuit board 112 may be a first surface 112*a* and a second surface 112*b* that are opposite to each other, and the first surface 112*a* may be a surface on which the pattern portion 114*a* of the antenna pattern 114 is formed, and the second surface 112*b* may be a surface covered by the insulating member 150 while the lead portion 114*b* of the antenna pattern 114 is formed.

That is, the pattern portion 114*a* of the antenna pattern 114 may not be formed on the second surface 112*b* of the circuit board 112 in the antenna modules 100 and 200 according to one embodiment of the present invention, and only the pattern portion 114*a* of the antenna pattern 114 may be formed on the first surface 112*a* of the circuit board 112 or a portion of the lead portion 114*b* may be formed on the first surface 112*a* of the circuit board 112 together with the pattern portion 114*a* of the antenna pattern 114.

In addition, the lead portion 114*b* may connect the pattern portion 114*a* of the antenna pattern 114 to the connection terminal 114*c* without overlapping each other on the same surface of the circuit board 112. In addition, the lead portion 114*b* may be formed in an appropriate number so that two pattern portions may be connected to each other without overlapping each other on the same surface of the circuit board 112.

For example, when a plurality of lead portions 114*b* are formed on the circuit board 112, all of the plurality of lead portions 114*b* may be formed only on the second surface 112*b* of the circuit board 112. In addition, some of the plurality of lead portions 114*b* may be formed on the first surface 112*a* of the circuit board 112, and the remaining lead portions may be formed on the second surface 112*b* of the circuit board 112.

Figure 2:
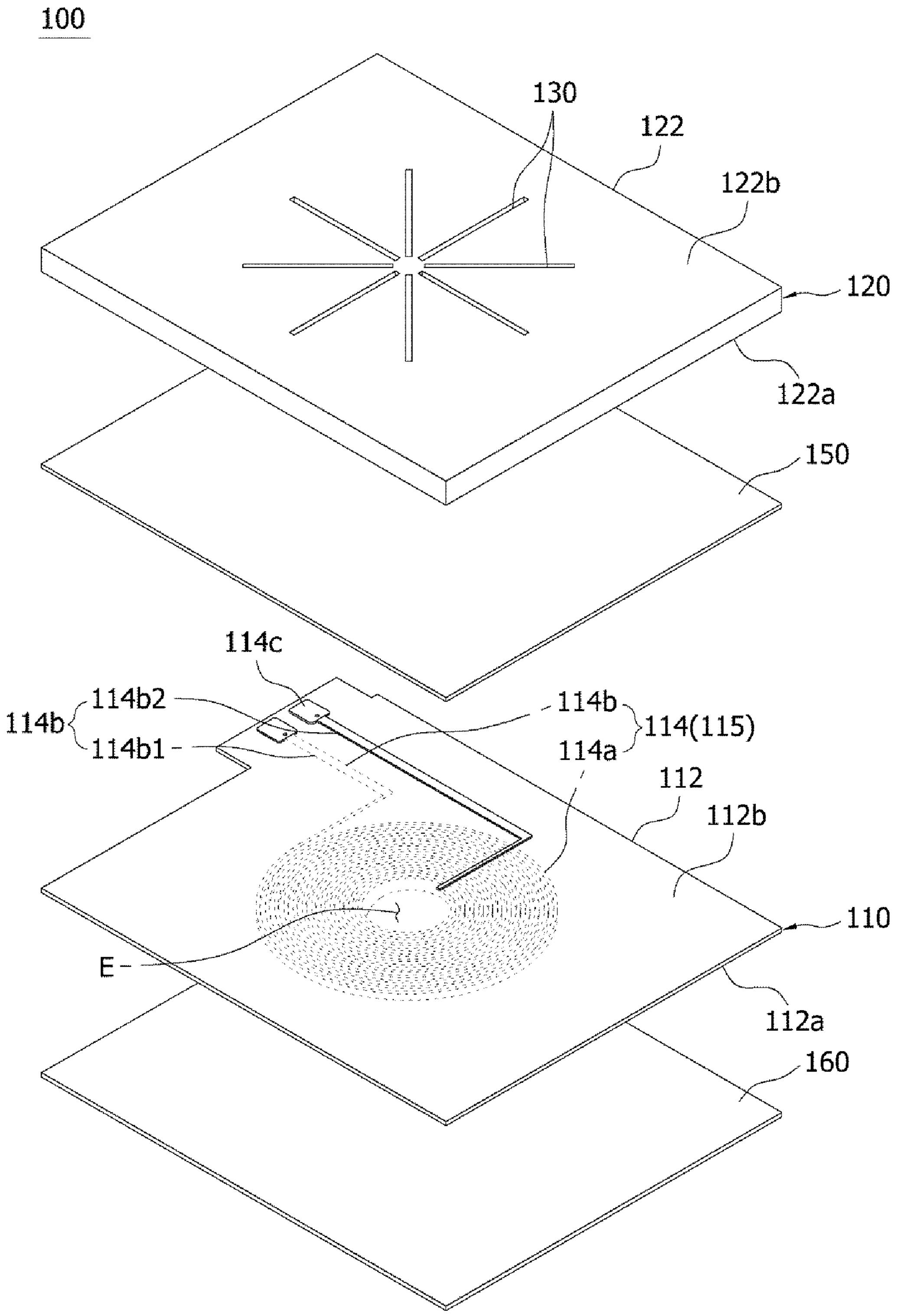
FIG. 2 is an exploded view of FIG. 1.
Figure 4:
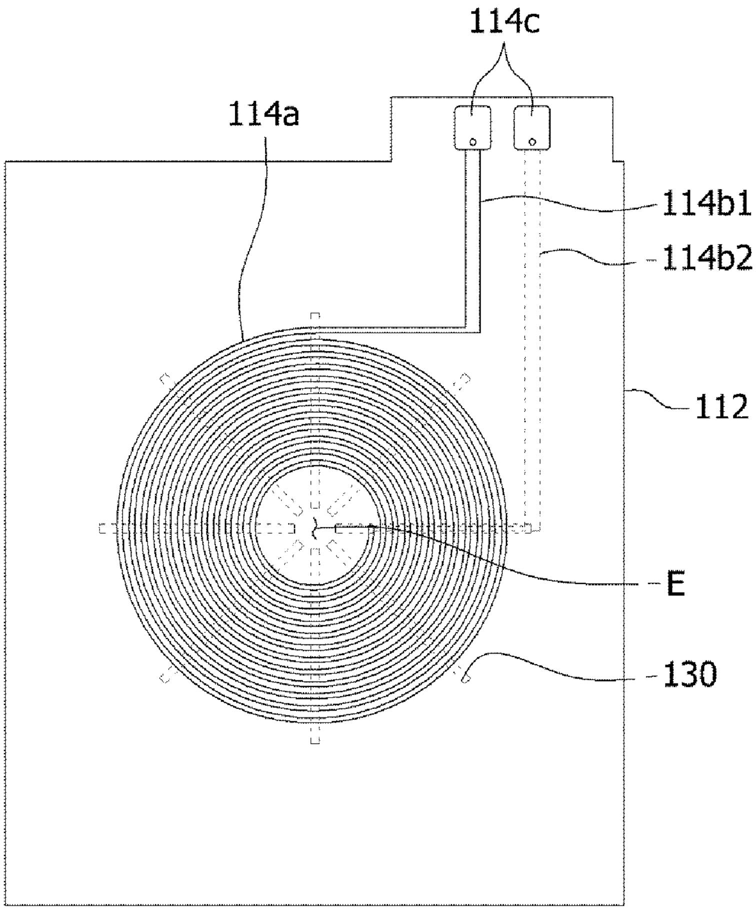
FIG. 4 is a plan view illustrating an arrangement relationship between the antenna pattern and the eddy current reducing pattern portions in FIG. 1.

As a specific example, when the antenna pattern 114 is provided as one in the antenna module 100 according to one embodiment of the present invention as shown in FIGS. 2 and 4, the pattern portion 114*a* of the antenna pattern 114 may be formed on the first surface 112*a* of the circuit board 112.

In this case, the lead portion 114*b* of the antenna pattern 114 may include a first lead portion 114*b*1 formed on the first surface 112*a* of the circuit board 112 and a second lead portion 114*b*2 formed on the second surface 112*b* of the circuit board 112 so that both ends of the pattern portion 114*a* may be connected to the connection terminals 114*c*, respectively.

Figure 6:
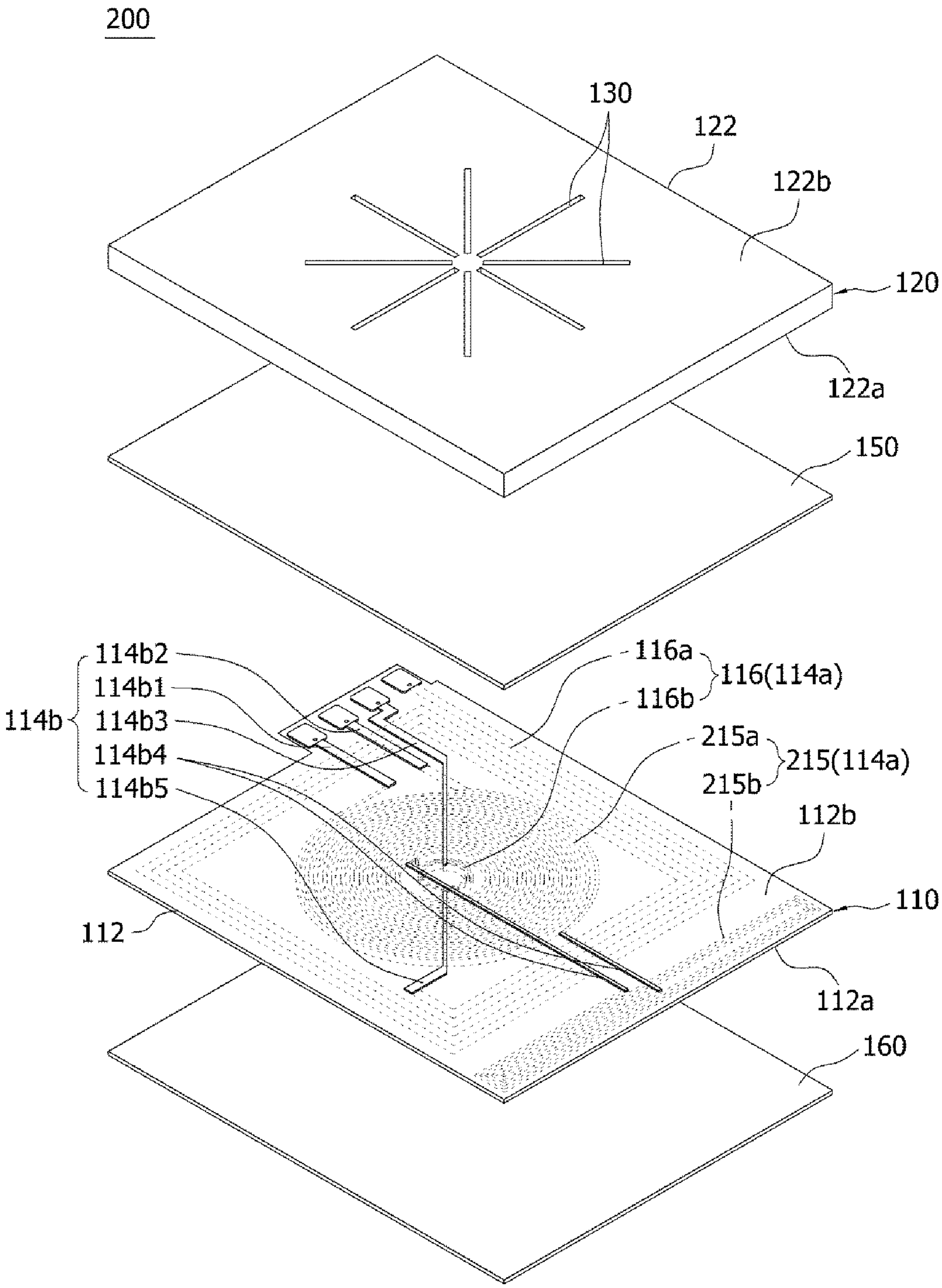
FIG. 6 is an exploded view of FIG. 5.
Figure 8:
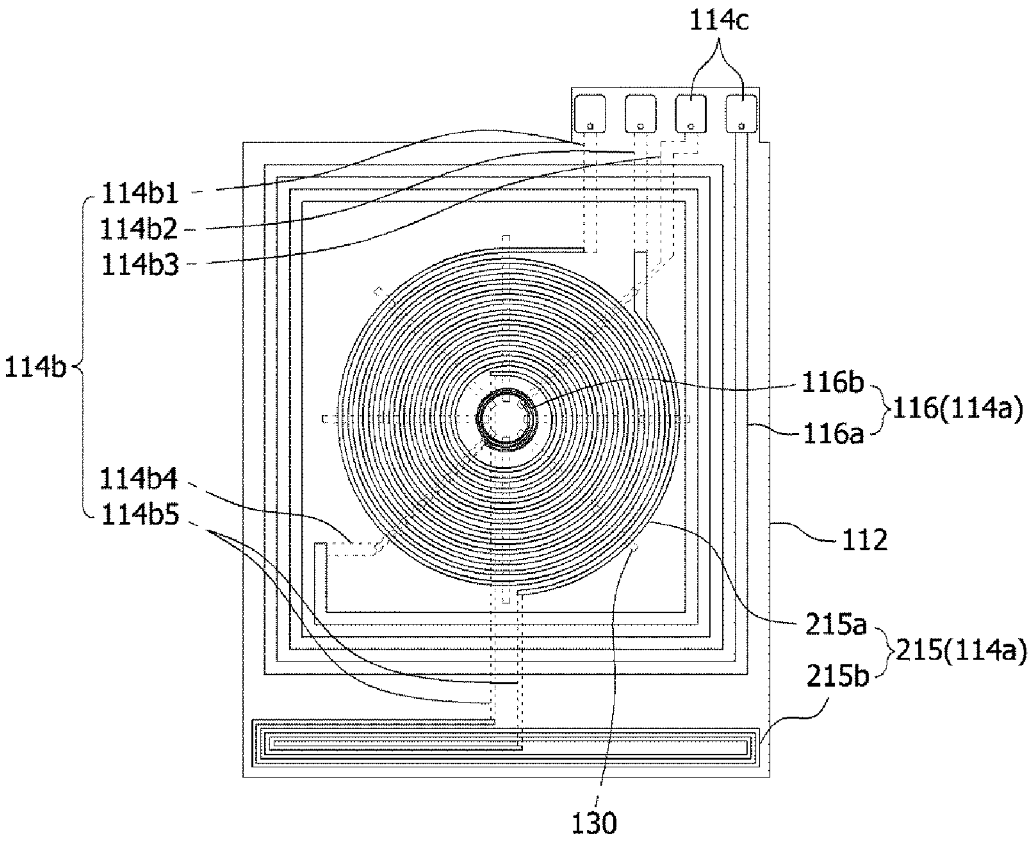
FIG. 8 is a plan view illustrating an arrangement relationship between an antenna pattern and an eddy current reducing pattern portion in FIG. 5.

As another example, as shown in FIGS. 6 and 8, in the antenna module 100 according to one embodiment of the present invention, when the antenna pattern 114 is formed in a combo type including the wireless communication antenna 116 together with the wireless power transfer antenna 215, each of the pattern portion 114*a* of the wireless power transfer antenna 215 and the pattern portion 114*a* of the wireless communication antenna 116 may be formed on the first surface 112*a* of the circuit board 112.

In this case, each of the first lead portion 114*b*1 and the second lead portion 114*b*2 configured to respectively connect the pattern portion 114*a* of the wireless power transfer antenna 215 to the connection terminals 114*c*, a third lead portion 114*b*3 configured to connect the pattern portion 114*a* of the wireless communication antenna 116 to the connection terminal 114*c*, a fourth lead portion 114*b*4 configured to interconnect the aforementioned first wireless communication antenna 116*a* and the second wireless communication antenna 116*b*, and a fifth lead portion 114*b*5 configured to interconnect the aforementioned first wireless power transfer antenna 215*a* and the second wireless power transfer antenna 215*b* may be formed on the second surface 112*b* of the circuit board 112.

However, the lead portion formed on the second surface 112*b* of the circuit board 112 is not limited to the aforementioned contents, and the total number and formation position of the lead portion may be appropriately changed according to the total number of antenna patterns formed on the circuit board 112 and the arrangement relationship of the antenna patterns.

As such, a portion of the lead portion 114*b* or the entire lead portion 114*b* may be formed on the second surface 112*b* of the circuit board 112 in the antenna modules 100 and 200 according to one embodiment of the present invention without forming the pattern portion 114*a* of the antenna pattern 114.

Accordingly, the antenna modules 100 and 200 according to one embodiment of the present invention may minimize an area of a circuit pattern formed on the second surface 112*b* of the circuit board 112, and a circuit pattern may be formed only at a local position of the second surface 112*b*.

At this time, the pattern portion 114*a* formed on the first surface 112*a* of the circuit board 112 and the lead portion 114*b* formed on the second surface 112*b* of the circuit board 112 may be formed on both surfaces of the circuit board 112 to have different thicknesses.

Figure 3:
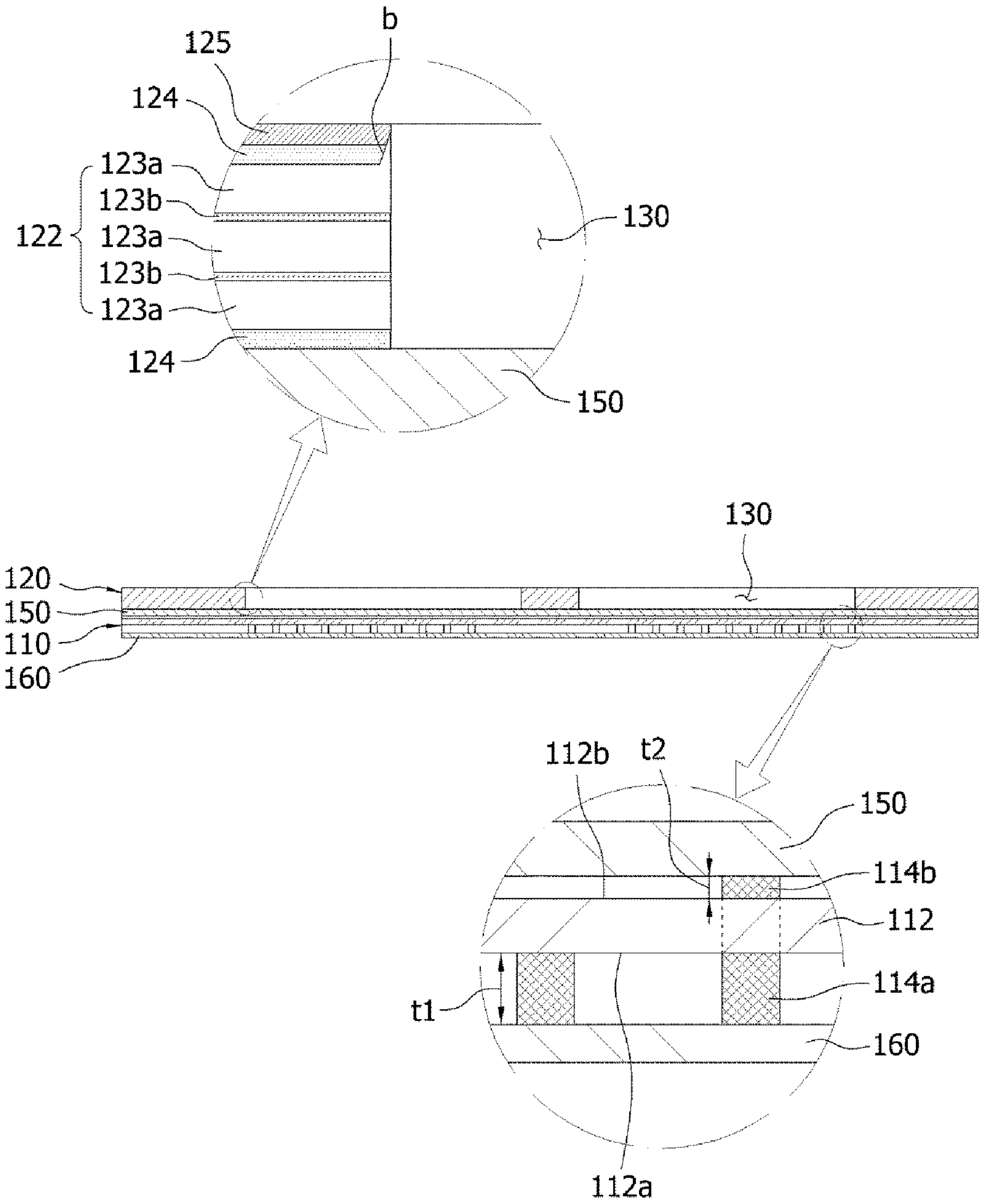
FIG. 3 is a cross-sectional view in A-A direction of FIG. 1.
Figure 7:
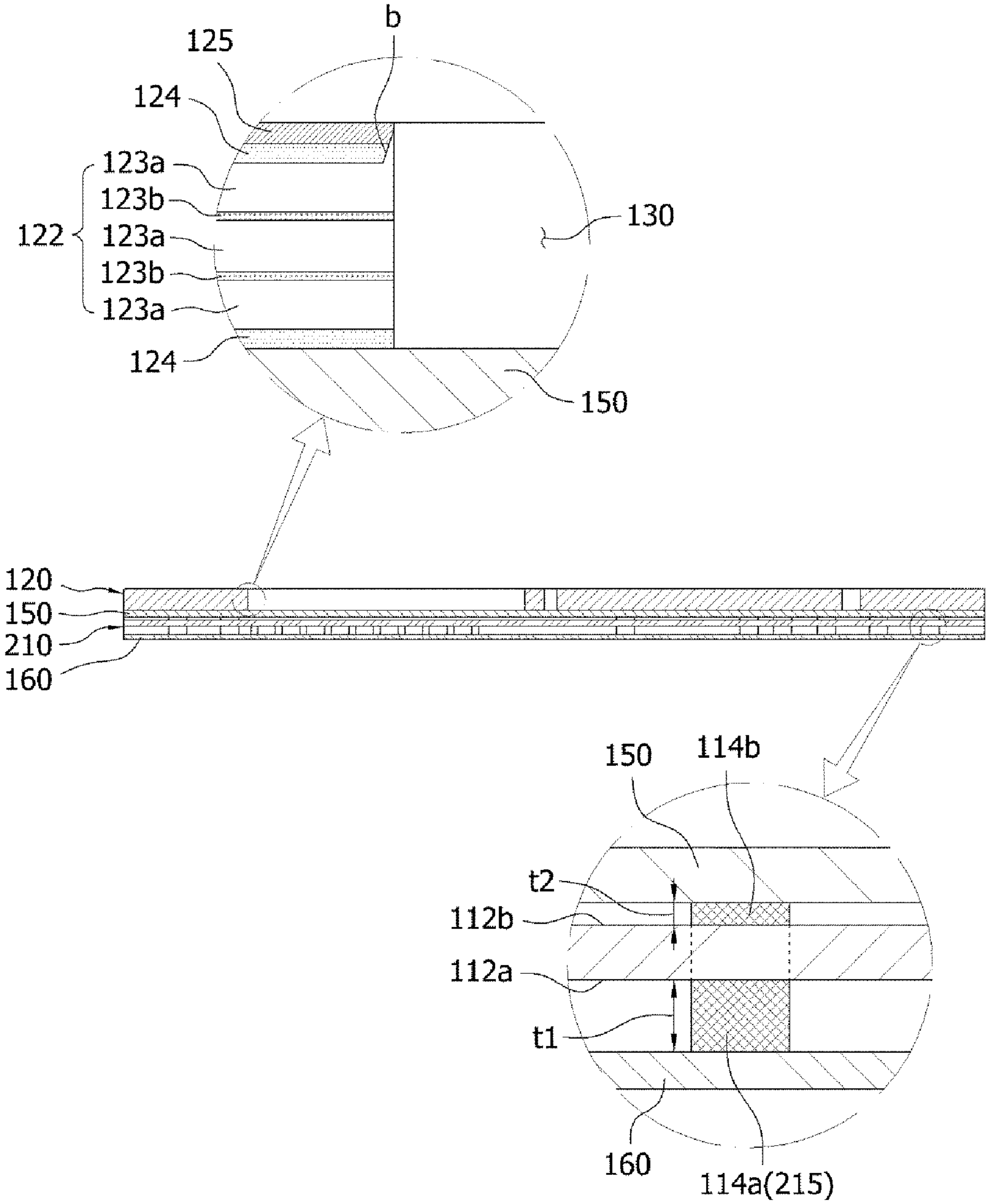
FIG. 7 is a cross-sectional view in B-B direction of FIG. 5.

That is, as shown in FIGS. 3 and 7, a thickness T2 of the lead portion 114*b* formed on the second surface 112*b* of the circuit board 112 may be thinner than a thickness T1 of the pattern portion 114*a* formed on the first surface 112*a* of the circuit board 112.

Accordingly, in the antenna modules 100 and 200 according to one embodiment of the present invention, the antenna unit 110 or 210 may be implemented in an asymmetric type having different thicknesses protruding from the first surface 112*a* and the second surface 112*b* based on the circuit board 112.

Accordingly, even though the overall thickness of the antenna unit 110 or 210 each including the circuit board 112 and the antenna pattern 114 in the antenna modules 100 and 200 according to one embodiment of the present invention is maintained the same as in the related art, the thickness of the pattern portion 114*a* formed on the first surface 112*a* of the circuit board 112 may be increased as much as a reduction in thickness of the lead portion 114*b* formed on the second surface 112*b* of the circuit board 112.

For this reason, in the antenna modules 100 and 200 according to one embodiment of the present invention, the thickness of the pattern portion 114*a* functioning as an antenna may be increased while maintaining the same overall thickness of the antenna unit 110 or 210 as in the related art, and thus the resistance of the pattern portion 114*a* itself may be reduced, so that the performance of the antenna may be improved while maintaining a small thickness.

In addition, as described above, the lead portion 114*b* formed on the second surface 112*b* of the circuit board 112 in the antenna modules 100 and 200 according to one embodiment of the present invention may have a very small thickness compared to the related art and may be formed in a minimum area at a local position among the total area of the second surface 112*b*.

Accordingly, a portion of the second surface 112*b* of the circuit board 112 on which the lead portion 114*b* is not formed may be in direct contact with one surface of the insulating member 150. Accordingly, the antenna modules 100 and 200 according to one embodiment of the present invention may have an effect similar to that of increasing the thickness of the insulating layer even though the thickness of the insulating member 150 covering the second surface 112*b* of the circuit board on which the lead portion 114*b* is formed is not increased.

For this reason, the antenna modules 100 and 200 according to one embodiment of the present invention may maintain excellent insulation even when the insulating member 150 having a small thickness is disposed between the antenna unit 110 or 210 and the magnetic field shielding sheet 120.

In addition, in the antenna modules 100 and 200 according to one embodiment of the present invention, even though the magnetic field shielding sheet 120 includes an eddy current reducing pattern portion 130, burrs b or particles generated on the magnetic field shielding sheet 120 in the process of forming the eddy current reducing pattern portion 130 may be prevented from being shorted with the circuit pattern of the circuit board 112.

Details of the eddy current reducing pattern portion 130 will be described below.

The magnetic field shielding sheet 120 may be disposed on one surface of the antenna unit 110 or 210. The magnetic field shielding sheet 120 may shield the magnetic field generated from the antenna unit 110 or 210.

Accordingly, the magnetic field shielding sheet 120 may improve the performance of the antenna unit 110 or 210.

To this end, the magnetic field shielding sheet 120 may be attached to one surface of the insulating member 150 covering the second surface 112*b* of the circuit board 112.

Here, the insulating member 150 may be disposed between the magnetic field shielding sheet 120 and the antenna unit 110 or 210, and may be disposed on one surface of the antenna unit 110 or 210 to cover the second surface 112*b* of the circuit board 112 on which the lead portion 114*b* is formed, as described above.

The insulating member 150 may be made of a material having insulating properties. Accordingly, the insulating member 150 may prevent an electrical short circuit between the magnetic field shielding sheet 120 and the antenna unit 110 or 210. For example, the insulating member 150 may be a film member having insulating properties.

Meanwhile, the magnetic field shielding sheet 120 may include a sheet body 122, and the sheet body 122 may be made of a material having magnetism to shield the magnetic field generated from the antenna unit 110 or 210.

At this time, the sheet body 122 may be formed of a material containing a metal component.

For example, the sheet body 122 may be a ribbon sheet 123*a* including at least one of an amorphous alloy and a nano-crystalline alloy as shown in FIGS. 3 and 7, and the sheet body 122 may be a multilayer sheet in which a plurality of ribbon sheets 123*a* are stacked in multiple layers through an adhesive layer.

However, the material of the sheet body 122 is not limited thereto, and all known materials used as a magnetic field shielding sheet, such as ferrite, a polymer, and permalloy, may be used.

In addition, the magnetic field shielding sheet 120 may further include a protective film 125 attached to at least one surface of upper and lower surfaces of the sheet body 122 through an adhesive layer 124, and the sheet body 122 may be attached to one surface of the insulating member 150 through the adhesive layer 124 formed on one surface thereof.

At this time, the magnetic field shielding sheet 120 may include the eddy current reducing pattern portion 130 formed in the sheet body 122.

The eddy current reducing pattern portion 130 may reduce the generation of eddy currents by increasing the overall resistance of the sheet body 122. Accordingly, since the effects of eddy currents may be reduced in the antenna unit 110 or 210 through the eddy current reducing pattern portion 130, the effects of eddy currents may be reduced in the wireless power transfer antenna 115 or 215 and/or the wireless communication antenna 116.

For example, the eddy current reducing pattern portion 130 may be a linear through portion formed through the sheet body 122 so as to have a length greater than a width.

At this time, the sheet body 122 may include a crack 140 formed from the eddy current reducing pattern portion 130 together with the eddy current reducing pattern portion 130.

Figure 10:
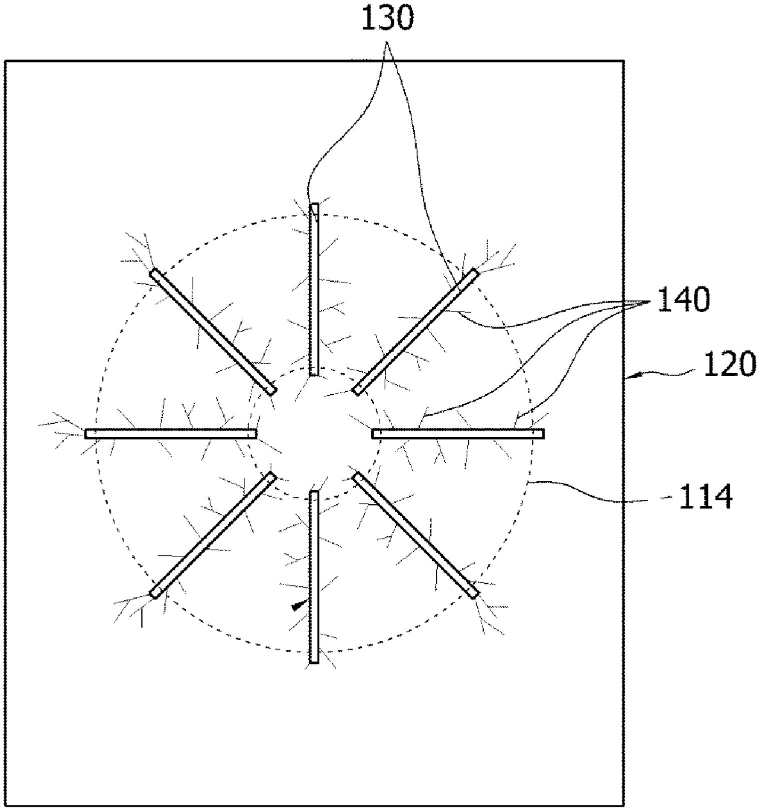
FIG. 10 is a view conceptually illustrating a crack formed extending from the eddy current reducing pattern portion as a magnetic field shielding sheet applicable to an antenna module according to the present invention.

That is, as shown in FIG. 10, the magnetic field shielding sheet 120 may include the eddy current reducing pattern portion 130 formed in an inner region of the sheet body 122 and a plurality of cracks 140 formed extending from the eddy current reducing pattern portion 130.

To this end, the sheet body 122 may be made of a material containing a metal component, and as described above, the sheet body 122 may be the ribbon sheet 123*a* including at least one of an amorphous alloy and a nano-crystalline alloy.

The sheet body 122 may be formed of a single-layer ribbon sheet 123*a*, but the sheet body 122 may be a multi-layered sheet in which a plurality of ribbon sheets 123*a* are stacked in multiple layers through an adhesive layer 123*b*. In this case, the multilayer sheet may be a multilayer sheet in which the plurality of ribbon sheets 123*a* are stacked in two to three layers. However, the total number of stacked layers of the multilayer sheet is not limited thereto, and the total number of stacked layers of the multilayer sheet may be appropriately changed according to design conditions.

In addition, the sheet body 122 may be a hybrid sheet in which a ribbon sheet of an amorphous alloy and a ribbon sheet of a nano-crystalline alloy are combined.

Here, as described above, when the protective film 125 is attached to at least one surface of the sheet body 122, the eddy current reducing pattern portion 130 may be formed to pass through both the sheet body 122 and the protective film 125.

The plurality of cracks 140 may be formed by being induced from the eddy current reducing pattern portion 130 by an external force applied to the sheet body 122 while forming the eddy current reducing pattern portion 130 in the sheet body 122.

Here, the eddy current reducing pattern portion 130 may be formed in an appropriate number of one or more. In addition, the eddy current reducing pattern portion 130 may be formed to have a length greater than a width. In addition, the total number of the plurality of cracks 140 may be larger than that of the eddy current reducing pattern portions 130.

At this time, the eddy current reducing pattern portion 130 may be formed locally with respect to a partial area of the entire area of the sheet body 122.

That is, the eddy current reducing pattern portion 130 may be formed locally with respect to a partial area of the entire area of the sheet body 122 in consideration of an arrangement relationship with the wireless power transfer antenna 115 or 215 that transmit or receive wireless power.

For example, as shown in FIGS. 1 and 5, the eddy current reducing pattern portion 130 may be formed only in a region corresponding to the antenna pattern 114 of the entire area of the sheet body 110. In this case, the antenna pattern 114 may be the wireless power transfer antenna 115 or 215.

Accordingly, since the eddy current reducing pattern portion 130 is partially formed in only a partial area corresponding to the wireless power transfer antenna 115 or 215 among the entire area of the magnetic field shielding sheet 120, the overall resistance of the sheet itself may be increased, thereby minimizing the influence of an eddy current and having a high permeability of 2000 or more at a very small thickness.

As a non-limiting example, the magnetic field shielding sheet 120 may have a high permeability of 2000 or more even with a very small total thickness of 55 μm to 85 μm.

For this reason, the magnetic field shielding sheet 120 may increase the inductance of the wireless power transfer antenna 115 or 215 while being implemented in a thin shape through a very small thickness.

Specifically, as shown in FIGS. 4 and 8, a plurality of eddy current reducing pattern portions 130 may be formed at positions corresponding to the wireless power transfer antenna 115 or 215, and the plurality of eddy current reducing pattern portions 130 may be disposed spaced apart from each other.

In addition, the plurality of eddy current reducing pattern portions 130 may be radially formed with respect to the center point of the hollow portion E in the wireless power transfer antenna 115 or 215.

In this case, the width of each of the eddy current reducing pattern portions 130 may be 0.1 mm to 0.4 mm, and the total number of the eddy current reducing pattern portions 130 formed in the sheet body 122 may be 4 to 16.

When the width of the eddy current reducing pattern portion 130 exceeds 0.4 mm, the amount of magnetic field leaked through the eddy current reducing pattern portion 130 formed in the sheet body 122 may increase, thereby degrading the performance as a shielding sheet.

On the other hand, when the width of the eddy current reducing pattern portion 130 is less than 0.1 mm, the process of forming the eddy current reducing pattern portion 130 in the sheet body 122 is difficult, and productivity may decrease.

In addition, when the total number of the eddy current reducing pattern portions 130 formed in the sheet body 122 is 17 or more compared to when the total number of the eddy current reducing pattern portions 130 formed in the sheet body 122 is 4 to 16 or less, the resistance of the sheet itself increases as the total number of the eddy current reducing pattern portions 130 increases, but the additional eddy current reducing effect is insignificant, and it is difficult to realize a high permeability of 2000 or more.

On the other hand, when the total number of the eddy current reducing pattern portions 130 formed in the sheet body 122 is less than 4 compared to when the total number of the eddy current reducing pattern portions 130 formed in the sheet body 122 is 4 to 16 or less, it is advantageous for realizing a high permeability of 2000 or more, but the resistance of the sheet itself is insufficient, so that property degradation due to eddy current loss may occur.

As such, in the antenna modules 100 and 200 according to one embodiment of the present invention, the eddy current reducing pattern portion 130 may be partially formed only in a partial region corresponding to the wireless power transfer antenna 115 or 215, thereby preventing electrical short circuit occurrence due to the burrs b generated in the process of forming the eddy current reducing pattern portion 130 or particles separated from the eddy current reducing pattern portion 130.

Accordingly, the antenna modules 100 and 200 according to one embodiment of the present invention may improve short circuit failure due to the burrs b or particles, thereby increasing the production yield, and may improve short circuit failure due to the burrs b or particles even without increasing the thickness of the insulating member 150 disposed between the antenna unit 110 or 210 and the magnetic field shielding sheet 120.

Figure 9:
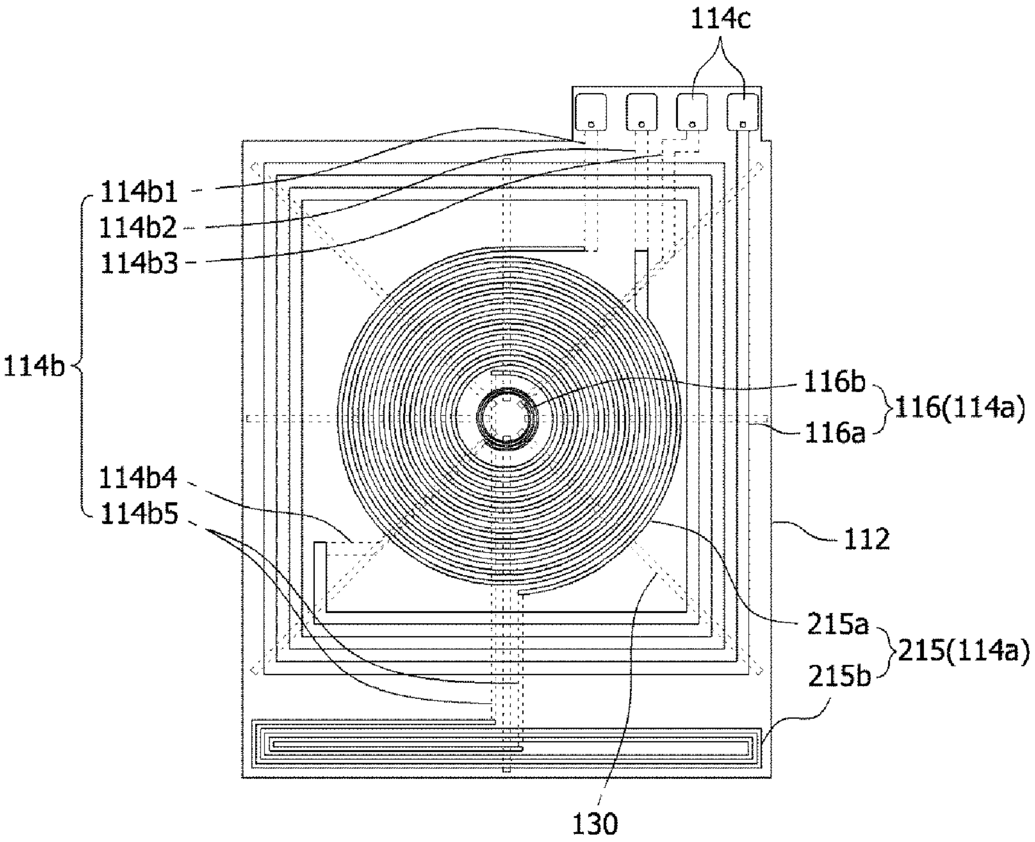
FIG. 9 is a plan view illustrating another arrangement relationship between an antenna pattern and an eddy current reducing pattern portion in FIG. 5.

However, the formation position of the eddy current reducing pattern portion 130 is not limited thereto, and as shown in FIG. 9, when the antenna unit 210 is provided in a combo type including the wireless communication antenna 116 together with the wireless power transfer antenna 215, the eddy current reducing pattern portion 130 may be formed to cover a region corresponding to the wireless power transfer antenna 215 as well as a region corresponding to the wireless communication antenna 116.

Meanwhile, as described above, when the eddy current reducing pattern portion 130 is formed as a through portion formed to pass through the sheet body 122, the through portion may be formed by punching through a punching process.

That is, the through portion may be formed by pressing the sheet body 122 using a blade mold or a press mold.

For example, the sheet body 122 may include a facing surface **122*a* facing the second surface 112*b* of the circuit board 112 and the insulating member 150 and a non-facing surface 122*b* opposite to the facing surface 122*a*, and the punching process may be performed such that a blade mold or a press mold presses the sheet body 122 in a direction from the facing surface 122*a* toward the non-facing surface 122*b***.

In this case, as shown in the enlarged views of FIGS. 3 and 7, the magnetic field shielding sheet 120 attached to one surface of the insulating member 150 through the adhesive layer 124 may have the facing surface **122*a* attached to one surface of the insulating member 150 through the adhesive layer 124**.

Accordingly, even though the magnetic field shielding sheet 120 includes the eddy current reducing pattern portion 130 formed through the punching process in the antenna modules 100 and 200 according to one embodiment of the present invention, the burrs b or particles generated in the process of forming the eddy current reducing pattern portion 130 may be generated only on the side of the non-facing surface **122*b***.

In addition, even though the burrs b or particles generated in the process of forming the eddy current reducing pattern portion 130 are generated on the facing surface **122*a***, the generation amount of the burr b or particles may be minimized.

Accordingly, even though the magnetic field shielding sheet 120 including the eddy current reducing pattern portion 130 is attached to one surface of the insulating member 150 through the adhesive layer 124, the amount of the burrs b or particles that may be present between the sheet body 122 and the insulating member 150 may be minimized or the generation of the burrs b or particles may be prevented in advance.

For this reason, in the antenna modules 100 and 200 according to one embodiment of the present invention, even though the magnetic field shielding sheet 120 includes the eddy current reducing pattern portion 130 formed through punching and the insulating member 150 having a very small thickness is disposed between the antenna unit 110 or 210 and the magnetic field shielding sheet 120, the occurrence of a short circuit of the antenna unit 110 or 210 due to the burrs b or particles generated during the punching process may be prevented in advance.

Accordingly, since the insulating member 150 for preventing an electrical short circuit between the magnetic field shielding sheet 120 and the antenna units 110 or 210 in the antenna modules 100 and 200 according to one embodiment of the present invention may have a small thickness equal to that of the related art, the antenna modules 100 and 200 according to one embodiment of the present invention may maintain electrical stability while maintaining the overall thickness. In addition, since the antenna modules 100 and 200 according to one embodiment of the present invention do not need to increase the thickness of the insulating member 150, an increase in production costs due to an increase in usage of the insulating member 150 may be prevented.

Meanwhile, the antenna modules 100 and 200 according to one embodiment of the present invention may further include a separate cover member 160 disposed on one surface of the antenna unit 110 or 210, as shown in FIGS. 2 and 6.

One surface of the cover member 160 may cover the first surface 112*a* of the circuit board 112 on which the pattern portion 114*a* is formed.

For example, the cover member 160 may be a film member having insulating properties, and the cover member 160 may also be a release film removed during use.

Although one embodiment of the present invention has been described above, the spirit of the present invention is not limited to the embodiments presented herein, and those skilled in the art who understand the spirit of the present invention may easily propose other embodiments by adding, changing, deleting, and the like within the same spirit, but this also falls within the scope of the present invention.

The invention claimed is:

1. An antenna module, comprising:

an antenna unit including an antenna pattern which has a pattern portion and a lead portion formed, respectively, on both surfaces of a circuit board;

a magnetic field shielding sheet including a sheet body made of a magnetic material to shield a magnetic field, and a plurality of eddy current reducing pattern portions formed in the sheet body to reduce the generation of an eddy current by increasing a resistance of the sheet body; and an insulating member disposed between the antenna unit and the magnetic field shielding sheet, wherein the antenna unit is provided in an asymmetric form in which the pattern portion and the lead portion respectively formed on both surfaces of the circuit board have different thicknesses, wherein the eddy current reducing pattern portion is a through portion formed to pass through the sheet body through punching, and the sheet body includes a facing surface facing the insulating member and the circuit board and a non-facing surface opposite to the facing surface, wherein the through portion is formed in a direction from the facing surface toward the non-facing surface of the sheet body.

2. The antenna module of claim 1, wherein the pattern portion is formed on a first surface of the circuit board, and at least a portion of the lead portion is formed on a second surface of the circuit board opposite to the first surface, and a thickness of the lead portion formed on the second surface of the circuit board is thinner than that of the pattern portion.

3. The antenna module of claim 2, wherein the insulating member is disposed between the antenna unit and the magnetic field shielding sheet to cover the second surface of the circuit board.

4. The antenna module of claim 1, wherein the insulating member is a film member having insulating properties.

5. The antenna module of claim 1, wherein the eddy current reducing pattern portion is formed in a region corresponding to the antenna pattern among an entire area of the sheet body.

6. The antenna module of claim 1, wherein the antenna pattern is a wireless power receiving antenna configured to receive wireless power.

7. The antenna module of claim 1, wherein the antenna pattern includes a wireless power receiving antenna configured to receive wireless power and a wireless communication antenna for wireless data communication.

8. The antenna module of claim 7, wherein the eddy current reducing pattern portion is formed only in a region corresponding to the wireless power receiving antenna.

9. The antenna module of claim 7, wherein the wireless communication antenna includes a first wireless communication antenna formed on the circuit board to surround the wireless power receiving antenna and a second wireless communication antenna formed on the circuit board to be located at a side of a hollow portion of the wireless power receiving antenna, and the first wireless communication antenna and the second wireless communication antenna are connected in series.

10. The antenna module of claim 1, wherein the eddy current reducing pattern portion is a linear through portion formed to pass through the sheet body to have a length greater than a width.

11. The antenna module of claim 1, wherein the sheet body includes a plurality of cracks formed extending from the eddy current reducing pattern portion.

* * * * *